Figure 1:
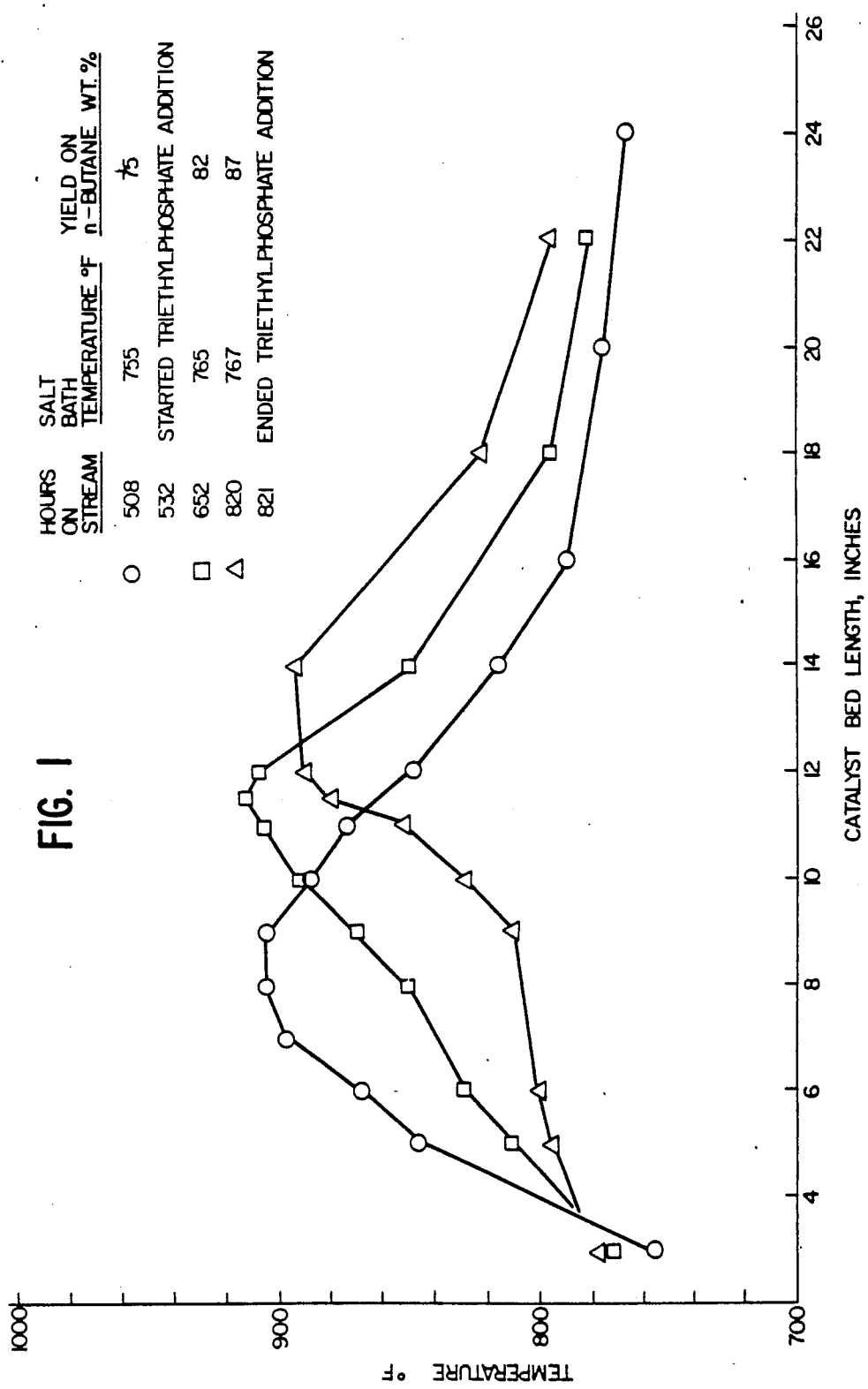

United States Patent [19]

Edwards

[11] Patent Number: 4,701,433

[45] Date of Patent: Oct. 20, 1987

[54] PROCESS FOR IMPROVING PHOSPHORUS-VANADIUM OXIDE AND PHOSPHORUS-VANADIUM-CO-METAL OXIDE CATALYSTS

[75] Inventor: Robert C. Edwards, Naperville, Ill.

[73] Assignee: Amoco Corporation, Chicago, Ill.

[21] Appl. No.: 900,528

[22] Filed: Aug. 26, 1986

Related U.S. Application Data

[63] Continuation of Ser. No. 736,942, May 22, 1985, abandoned, which is a continuation-in-part of Ser. No. 530,202, Sep. 8, 1983, abandoned.

[51] Int. Cl.$^4$ .................... B01J 27/198; B01J 27/19; B01J 31/00; C07D 307/34
[52] U.S. Cl. .................................. 502/209; 502/211; 502/162; 549/259; 549/260
[58] Field of Search ................ 502/162, 209, 211, 34, 502/38

[56] References Cited

U.S. PATENT DOCUMENTS

| Re. 30,430 | 11/1980 | Kerr | 260/346.75 |
|---|---|---|---|
| 3,296,282 | 1/1967 | Kerr | 260/346.8 |
| 4,081,460 | 3/1978 | Kerr et al. | 252/435 |
| 4,515,899 | 5/1985 | Click et al. | 502/209 X |
| 4,525,471 | 6/1985 | Bremer et al. | 502/209 |
| 4,596,818 | 6/1986 | Newsome et al. | 514/401 |

FOREIGN PATENT DOCUMENTS

| 1071647 | 2/1980 | Canada . |
| 2550119 | 5/1976 | Fed. Rep. of Germany . |
| 1464198 | 2/1977 | United Kingdom . |

*Primary Examiner*—Andrew Metz
*Assistant Examiner*—William G. Wright
*Attorney, Agent, or Firm*—Matthew R. Hooper; William H. Magidson; Ralph C. Medhurst

[57] ABSTRACT

A process is disclosed for the improvement of a vanadium-phosphorus-oxygen catalyst or a vanadium-phosphorus-oxygen-co-metal catalyst suitable for use in the manufacture of maleic anhydride from butane, which process comprises applying in situ water and a phosphorus compound in an amount to partially deactivate a portion of the catalyst in a catalyst bed containing an exotherm of reaction which was present in the catalyst bed prior to the addition of the phosphorus compound, thereby moving the exotherm downstream into the catalyst bed and thus improving the catalyst.

These catalysts are useful for the manufacture of maleic anhydride from butane feedstock.

102 Claims, 6 Drawing Figures

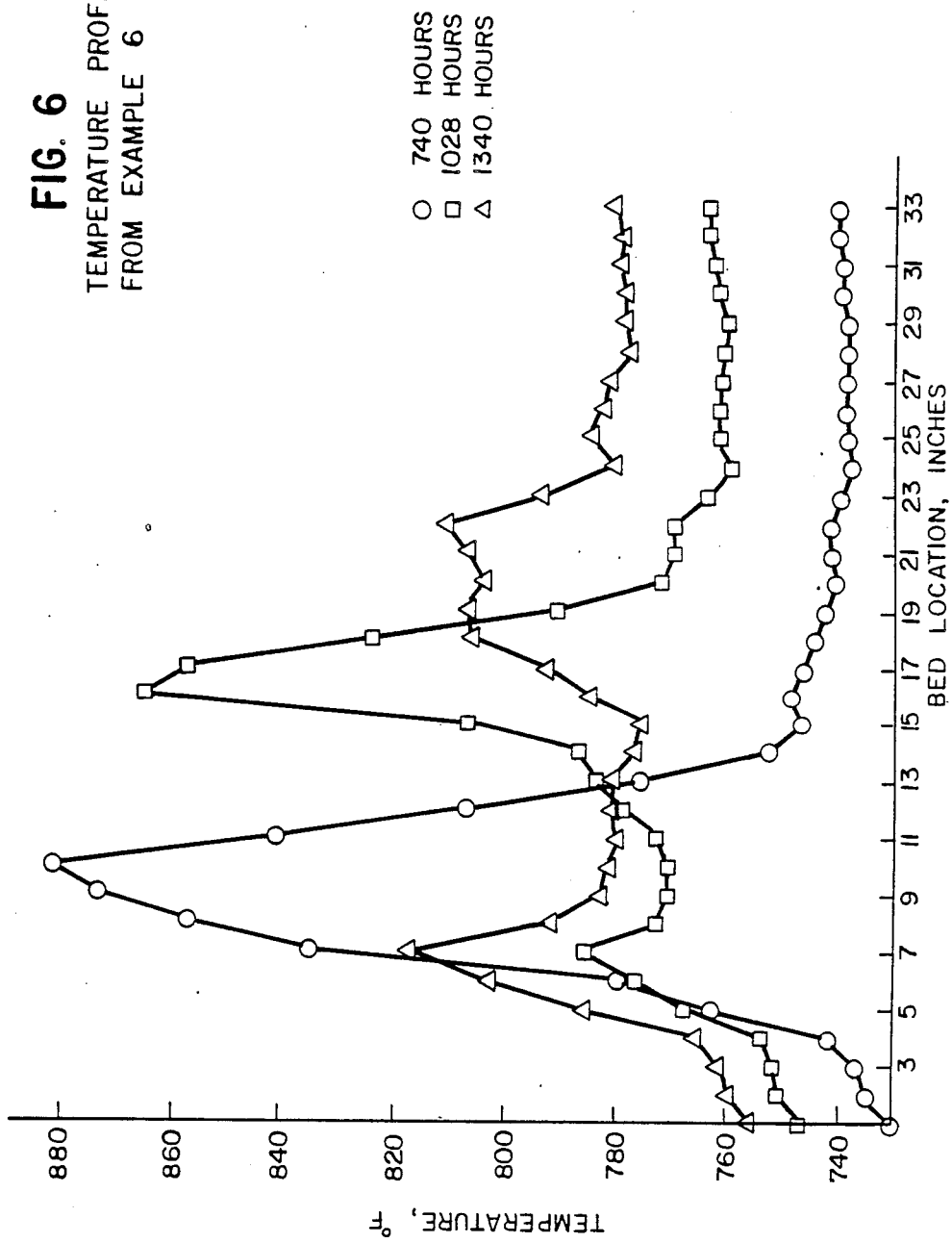

PROCESS FOR IMPROVING PHOSPHORUS-VANADIUM OXIDE AND PHOSPHORUS-VANADIUM-CO-METAL OXIDE CATALYSTS

This is a continuation of application Ser. No. 736,942, filed May 22, 1985, which in turn is a continuation in part of Ser. No. 530,202, filed Sept. 8, 1983, both abandoned.

BACKGROUND

The field of this invention relates to processes for improving phosphorus-vanadium oxide and phosphorus-vanadium-co-metal oxide catalysts suitable for the oxidation of butane, the $C_4$ hydrocarbons such as butene and butadiene, and benzene to maleic anhydride by treating the catalyst in situ with water and phosphorus compounds in sufficient quantity to cause the reaction exotherm or "hot spot" to shift farther into the catalyst bed.

Maleic anhydride is of significant commercial interest throughout the world and is extensively used in the manufacture of alkyd resins. It is also a versatile intermediate for chemical synthesis. Consequently, large quantities of maleic anhydride are produced each year to satisfy these needs.

In general, catalysts proposed for the oxidation of butane, other $C_4$ hydrocarbons, and benzene to maleic anhydride have been based upon vanadium and phosphorus. In U.S. Pat. No. 3,293,268, it is disclosed that the oxidation of butane to maleic anhydride can be performed in the presence of a phosphorus-vanadium-oxygen-containing complex catalyst. Though this catalyst is capable of oxidizing butane, it does not give sufficiently high yields of maleic anhydride. Yields of maleic anhydride of only 30 to 50 weight percent are reported. Various activators, stabilizers, and promoters have been disclosed in the prior art improve the yields of maleic anhydride. References include U.S. Pat. Nos. 3,867,411; 3,832,359; 3,888,886; 4,002,650; 4,147,661; 4,149,992; 4,151,116; 4,152,338; 4,152,339; 4,081,460; 4,043,943; 4,154,703; and British Application 2,019,839A. While the aforementioned prior art tends to bring about some improvement in the performance of the phosphorus-vanadium catalyst, there remains much room for improvement, particularly from the standpoint of high conversion, yield, and catalyst life. U.S. Pat. No. 4,081,460 relates to molybdenum-vanadium catalysts which are regenerated by the addition of phosphorus. Other references of interest include U.S. Pat. Nos. 4,002,174; 4,094,816; 4,089,807; 3,296,282; 3,474,041; and British Patent 1,464,198. While some of these references relate to catalyst regeneration, they do not relate to improving the performance of the catalyst by causing the reaction exotherm to shift farther into the catalyst bed using phosphorus compounds and water.

Our catalyst is suitably prepared in organic solvents by slurrying vanadium compounds and metal oxides, such as molybdenum oxide, zinc oxide, uranium oxide, tungsten oxide, tin oxide, and bismuth oxide, in organic solvents, preferably organic ether or alcohol solvents.

The object of the present invention is to improve the performance and extend the useful life of a phosphorus-vanadium oxide and a phosphorus-vanadium-co-metal oxide catalyst by adding phosphorus compounds in situ to the catalyst, thus causing the reaction exotherm "hot spot" to shift farther into the catalyst bed. A further object is to provide a process for the manufacture of maleic anhydride in the presence of the catalyst whose exotherm has shifted farther into the catalyst bed.

We have now discovered a method for increasing the selectivity of phosphorus-vanadium oxide and phosphorus-vanadium-co-metal oxide catalysts. According to our process, the vapor-phase oxidation of butane to maleic anhydride is conducted in a fixed-bed reactor by contacting the n-butane with oxygen and nitrogen in the presence of a vanadium-phosphorus-oxygen catalyst or a vanadium-phosphorus-oxygen catalyst promoted by a co-metal. The catalyst is treated in situ with water and phosphorus compounds in sufficient quantity to cause the reaction exotherm or "hot spot" to shift farther into the catalyst bed. On a given catalyst that has been extensively used, the yield of maleic anhydride is increased when the "hot spot" is moved farther into the catalyst bed where the catalyst is more selective. In a continuous or intermittent addition of phosphorus compounds and water to a catalyst whose yield has declined, the yield is increased by about 5 weight percent to about 15 weight percent without moving the "hot spot." When the "hot spot" is moved according to the process of the present invention, the yield is increased further by about 5 weight percent to about 20 weight percent. Optimally, with the exotherm at the new location, the in situ phosphorus addition is reduced or discontinued or the water addition is increased and a further improvement in the product yield is then obtained. This further increase in yield is due to an improved temperature profile in the catalyst bed over the addition of the phosphorus compound continuously and maintaining the "hot spot" in the same relative position. The improved temperature profile results when the partially deactivated catalyst in the original "hot spot" location reactivates. Usually, the yield improvement from this reactivation of the original "hot spot" catalyst is about 5 weight percent to about 20 weight percent.

The catalyst to be improved can be prepared in various ways including the one disclosed in U.S. Pat. No. 3,862,146, issued Jan. 21, 1975, having Edward M. Boghosian as its inventor. Alternatively, the catalyst to be improved can suitably be prepared from an alcohol solution which ahs been reacted with phosphorus pentoxide and has been saturated with an inorganic acid, such as hydrogen chloride. Other ways to prepare the catalyst are disclosed in U.S. Pat. No. 4,328,126 wherein the catalyst is made from an organic solvent system. Precipitation of the phosphorus-vanadium or phosphorus-vanadium-co-metal mixed oxide can suitably be effected by azeotropic distillation of the organic solvent and the water of reaction and the subsequent evaporation of the organic solvent. The atomic ratio of vanadium to phosphorus can suitably be in the range of about 0.5:1 to about 1.25:1, preferably in the range of about 0.6:1 to about 1:1. The total atomic ratio of the co-metal to vanadium advantageously is in the range of about 0.005:1 to about 0.25:1. The atomic ratio of phosphorus to vanadium is suitably in the range of about 2:1 to about 0.8:1, preferably about 1:1 to about 1.7:1. According to our process, the average valence of vanadium is in the range of about 3.8 to 4.2.

Addition of the phosphorus compound and water to the catalyst can suitably be conducted by adding water and the phosphorus compound, such as an alkyl ester of phosphoric acid, in a continuous or intermittent manner directly to the gaseous feed stream until the "hot spot" has been moved, and the addition is then terminated or reduced or the water addition is increased. The "hot spot" temperature is monitored by a thermowell and this records its movement. This method is particularly suitable in continuous processes which utilize multitubular upflow reactors.

The continuous improvement is applicable to phosphorus-vanadium oxide catalysts and to phosphorus-vanadium oxide catalysts promoted by metals. Suitable metals include molybdenum, zinc, tungsten, tin, bismuth, niobium, antimony, titanium, chromium, and uranium. The co-metal, such as molybdenum, zinc, tungsten, uranium, chromium, or tin may be added as a compound together with vanadium or separately introduced into the solution. Suitable co-metal compounds comprise their oxides and most soluble salts, such as the nitrates, chlorides, phosphates, sulfates, bromides, acetates, and others. Suitable molybdenum compounds comprise molybdenum oxide and most soluble molybdenum salts. If it is desired to improve physical properties of the catalysts, they may be treated with the suspension of an inert support, for example, alumina, titania, silicon carbide, kieselguhr, pumice, or silica. The catalyst may be reinforced with such materials at any stage in its preparation.

The vanadium compound can be vanadium pentoxide, vanadium tetrachloride, vanadium trichloride, vanadium oxydichloride, vanadium oxytrichloride, vanadium tetraoxide, vanadium oxalate, and most soluble vanadium complexes. Suitable vanadium compounds include: vanadium oxides, such as vanadium pentoxide, vanadium trioxide, and the like; vanadium oxyhalides, such as vanadyl chloride, vanadyl dichloride, vanadyl trichloride, vanadyl bromide, vanadyl dibromide, vanadyl tribromide, and the like; vanadium-containing acids, such as meta-vanadic acid, pyrovanadic acid, and the like; and vanadium salts, such as ammonium meta-vanadate, vanadium sulfate, vanadium phosphate, vanadyl formate, vanadyl oxalate, and the like. However, vanadium pentoxide is preferred.

In our process, various phosphorus compounds may be utilized, but alkyl eesters of phosphates are preferred. The catalyst exotherm can be shifted down the catalyst bed by adding about 0.005 to about 5 grams of phosphorus compounds per kilogram of catalyst per day and adding water to the feed gas stream giving a water concentration in this stream of about 1,000 to about 40,000 parts per million by weight based on the total weight of the feed gas stream.

The catalyst "hot spot" is moved farther into the catalyst bed, and its performance is improved by the addition of water and organophosphorus compounds, such as alkylphosphates, phosphites and phosphines. Representative phosphorus compounds have the following structure:

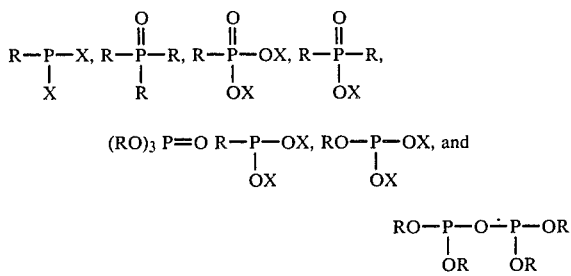

wherein R is phenyl or an alkyl radical of one to 6 carbon atoms and X is H or R. Suitable compounds are: the primary, $RPH_2$, secondary, $R_2PH$, and tertiary, $R_3P$, phosphines, such as ethyl phosphine; the tertiary phosphine oxides, $R_3PO$, such as tripropyl phosphine oxide; the primary, $RP(O)(OX)_2$, and secondary, $R_2P(O)OX$, phosphonic acids, such as benzene phosphonic acid; the esters of the phosphonic acids, such as diethyl methanephosphonate; the phosphonous acids, $RPO_2X_2$, such as benzenephosphonous acid and the esters thereof, such as the monoethyl ester; the phosphinous acids, $R_2POX$, such as diethyl phosphinous acid and the esters thereof, such as the monoethyl ester; the primary, $ROP(OX)_2$, secondary, $(RO)_2POX$, and tertiary, $(RO)_3P$, phosphites, such as diethyl phosphite, trimethyl phosphite, triethyl phosphite, triisopropyl phosphite, tripropyl phosphite and tributyl phosphite, and the pyrophosphites, such as tetraethyl pyrophosphite. The preferred phosphorus compound is an ester of orthophosphoric acid having the formula $(RO)_3P=O$ wherein R is hydrogen or a $C_1$–$C_4$ alkyl, at least one R being a $C_1$–$C_4$ alkyl. The preferred phosphate compounds are triethylphosphate or trimethylphosphate.

The "hot spot" management process for the improvement of the catalyst and the extension of the catalyst life may be initiated at any time. However, it is usually implemented when a decline in the selectivity of the catalyst is noted resulting in a decline in the yield from the process. The phosphorus compound and water can be added to the catalyst in a number of different ways. Usually, the catalyst will first be used for the oxidation of butane to maleic anhydride for a period of time until the yield of maleic anhydride diminishes. The phosphorus compound and water may then be added to increase the selectivity of the catalyst. This addition may be accomplished either with or without the continued flow of hydrocarbon and/or oxygen.

A preferred method for the improvement of the catalyst is the continuous or intermittent addition of a volatile organophosphorus compound and water to the gaseous stream of hydrocarbons and oxygen-containing gases entering the reactor. By such a technique, the activity of the catalyst is maintained through continuous improvement or stabilization. An advantage of this procedure is that the production of maleic anhydride does not have to be interrupted.

Still another method for the addition of the phosphorus compound to the catalyst is the addition of the phosphorus compound in liquid phase by pouring the phosphorus compound over the catalyst to be improved. This technique may suitably be performed at about room temperature, if desired.

Thus, the phosphorus compound and water may be added to the catalyst by a variety of methods, such as adding the phosphorus compound as a liquid or gas. Other techniques, such as the use of an aerosol to convey the phosphorus compound, are also satisfactory. Suspensions or colloidal solutions of the phosphorus compounds may be employed. Solvents for the phosphorus compound, such as water, may be included. The phosphorus compound and water can be added with the hydrocarbon feedstock or via a diluent gas, such as nitrogen. The overall temperature range for the addition of the phosphorus compound and water suitably will be about from 0° to 600° C., depending upon the particular compound selected. However, the preferred temperature of the catalyst at the time of addition of the phosphorus compound and water will be about 300° to about 500° C., with still better results being obtained at a catalyst temperature of at least 350° C. The upper limits of the temperature of the catalyst during the addition will suitably be about 450° or 500° C., or perhaps higher for short periods. The pressure during the addition may be atmospheric, subatmospheric or superatmospheric. The conditions of concentration, temperature and pressure should be adjusted to permit optimum contact of the phosphorus compound with the catalyst.

As pointed out above, the addition may be either intermittent or continuous. Of course, even if the phosphorus compound and water are added continuously, it is not necessary that they be added at a constant rate.

The phosphorus compound and water partially deactivate some portions of the catalyst. More specifically, the phosphorus partially deactivates the non-selective reaction exotherm and causes the reaction exotherm to migrate deeper into the catalyst bed in a beneficial manner. Note that the major portion of the catalyst bed is substantially unused; however, over a period of time that portion of the catalyst bed (fixed bed) wherein the reaction exotherm is located becomes less selective due to phosphorus loss with a corresponding drop in the yield of the anhydride product, and a corresponding increase in CO and $CO_2$. Thus, according to the present invention, the phosphorus compound and water are added to partially deactivate the non-selective reaction exotherm and to allow a new exotherm to occur in the relatively unused portion of the bed. Hence, there will be an improvement obtained over the relatively non-selective reaction exotherm. This process may be repeated as long as there is sufficient catalyst bed into which the exotherm may migrate. It should be appreciated that too much of the phosphorus compound and water passed into the catalyst bed can deactivate the entire bed; thus, an appropriate method of obtaining the benefits of the present invention is to add only enough phosphorus compound to cause the reaction exotherm to move gradually, until the original exotherm is partially deactivated and the relocated exotherm is at an acceptable location.

It has also been discovered that by utilizing the process of this invention, the temperature profile of the catalyst bed is made more isothermal which leads to a further increase in the anhydride yield over only the moving of the exotherm. When the addition of the phosphorus compound is stopped or reduced or the water addition is increased after the exotherm has migrated deeper into the catalyst bed, the catalyst in the original exotherm location begins to reactivate. During this process, the catalyst bed has a very broad "hot spot" having a much lower temperature than either the original exotherm or the new exotherm. The yield of the anhydride from this more isothermal catalyst bed is improved as the catalyst is more selective over the yield from the catalyst at the new exotherm location. As the original "hot spot" catalyst fully reactivates, the temperature profile returns to the original values.

It has further been discovered that by utilizing the process of this invention on a given catalyst, the temperature profile is made more isothermal during the addition of a phosphorus compound and water. The phosphorus compound and water shift the exotherm deeper into the catalyst bed but only partially deactivate the catalyst in the original "hot spot" location. Thus, the combined effects of a new exotherm location and a more isothermal catalyst bed lead to an increased anhydride yield during the application of the phosphorus compound and water.

This invention also comprises a process for oxidizing butane to maleic anhydride by contacting it in the presence of oxygen with the continuously improved catalyst and for improving the color and color stability of maleic anhydride produced by our novel process employing continuous or batch catalyst improvement. The catalyst improvement is conducted at a temperature of about 300° C. to about 500° C. The phosphorus compound or an aqueous medium comprising 0.01 to 100 weight percent of the phosphorus compound, more preferably about 25 to 75 weight percent of the phosphorus compound, is contacted with the feed gas stream flowing to the reactor. Alternatively, the phosphorus compound and water may be added directly to the butane feed prior to the mixing of the butane and air reactants. The oxidation of butane to maleic anhydride may be accomplished by contacting n-butane in low concentration in oxygen with the described catalyst. Air is entirely satisfactory as a source of oxygen, but synthetic mixtures of oxygen and diluent gases, such as nitrogen, may also be employed. Air enriched with oxygen may be used.

The gaseous feed stream to the oxidation reactors will normally contain air and about 0.2 to about 1.7 mole percent of n-butane. About 0.8 to 1.5 mole percent of n-butane is satisfactory for optimum yield of maleic anhydride for the process of this invention. Although higher concentrations may be employed, explosive hazards may be encountered. Lower concentrations of butane, less than about one percent, of couse, will reduce the total yield obtained at equivalent flow rates and, thus, are not normally economically employed. The flow rate of the gaseous stream through the reactor may be varied within rather wide limits, but the preferred range of operations is at the rate of about 100 to 4000 cc of feed per cc of catalyst per hour, and more preferably about 1000 to 2400 cc of feed per cc of catalyst per hour. Residence times of the gas stream will normally be less than about four seconds, more preferably less than about one second, and down to a rate where less efficient operations are obtained. The flow rates and residence times are calculated at standard conditions of 760 mm of mercury and 0° C. A variety of reactors will be found to be useful and multiple-tube heat exchanger-type reactors are quite satisfactory. The tops of such reactors may vary in diameter from about one-quarter inch to about three inches, and the length may be varied from about three to about ten or more feet. The oxidation reaction is an exothermic reaction and, therefore, relatively close control of the reaction temperatures should be maintained. It is desirable to have the surface of the reactors at a relatively constant temperature and some medium is needed to conduct heat from the reactors, such as lead and the like, but it has been found that eutectic salt baths are completely satisfactory. One such salt bath is a sodium nitrate-sodium nitrite-potassium nitrate eutectic constant temperature mixture. An additional method of temperature control is to use a metal block reactor whereby the metals surrounding the tube act as a temperature-regulating body. As will be recognized by one skilled in the art, the heat exchanger medium may be kept at the proper temperature by heat exchangers and the like. The reactor or reaction tubes may be iron, stainless steel, carbon steel, nickel, glass tubes, such as vycor, and the like. Both carbon steel and nickel tubes have excellent long life under the conditions of the reaction described herein. Normally, the reactors contain a preheat zone under an inert material, such as one-quarter inch Alundum pellets, inert ceramic balls, nickel balls or chips, and the like, present at about one-half to one-tenth the volume of the active catalyst present.

The temperature of reaction may be varied within some limits, but normally the reaction should be conducted at a temperature within a rather critical range. The oxidation reaction is exothermic and once reaction is underway, the main purpose of the salt bath or other media is to conduct heat away from the walls of the reactor and control the reaction. Better operations are normally obtained when the reaction temperature employed is no greater than 20° to 50° F. above the salt bath temperature. The temperature of the reactor, of course, will also depend to some extent upon the size of the reactor and the butane concentration.

The reaction may be conducted at atmospheric, superatmospheric or subatmospheric pressure. The exit pressure will be at least slightly higher than the ambient pressure to ensure a positive flow from the reaction. The pressure of the inert gases must be sufficiently high to overcome the pressure drop through the reactor.

Maleic anhydride may be recovered by a number of ways well-known to those skilled in the art. For example, the recovery may be by direct condensation or by absorption in suitable media, with specific operation and purification of the maleic anhydride. The following examples will serve to provide a fuller understanding of the invention, but it is to be understood that these examples are given for illustrative purposes only and will not be interpreted as limiting the invention in any way. In the examples, the terms "conversion", "selectivity" and "yield" are defined as follows:

$$\text{Conversion \%} = \frac{\text{Moles n-butane reacted}}{\text{Moles n-butane in feed}} \times 100$$

$$\text{Selectivity \%} = \frac{\text{Moles maleic anhydride produced}}{\text{Moles n-butane feed consumed}} \times 100$$

$$\text{Yield Wt. \%} = (\text{Conversion}) \times (\text{Selectivity}) \times 169$$

EXAMPLE 1

An extensively used phosphorus-vanadium-zinc catalyst from a large reactor, 124.5 g, was loaded into a pilot plant reactor having a 0.62-inch internal diameter (i.d.) reactor tube and a 33-inch catalyst bed. This reactor tube is encased in a salt bath to control the temperature and equipped with a 1/8-inch axial thermowell to measure the temperature profile of the catalyst bed. The reactor was operated at 1500 VHSV of 1.5 mole % no-butane in air feed.

After 508 hours on stream in this pilot reactor, the yield of maleic anhydride was 75 wt.% at a salt bath temperature of 755° F. The exotherm of the catalyst bed was located at about 8.5 inches into the catalyst bed as shown in FIG. 1. After 532 hours, the feed stream was passed through a saturator containing 1 g of triethylphosphate per liter of water. In this manner, about 10,000 parts per million by weight water are added to the reactor feed stream. The maleic anhydride yield improved to 82 wt.% at a salt bath temperature of 765° F. at 652 hours and the "hot spot" moved 11.5 inches into the catalyst bed (FIG. 1). At 820 hours, the exotherm was located at 14 inches into the catalyst bed (FIG. 1) and the yield of maleic anhydride was 87 wt.% at a salt bath temperature of 767° F. This demonstrates that by moving the reaction exotherm to a more selective position in the catalyst with triethylphosphate, the maleic anhydride yield from the reactor is increased.

Figure 2:
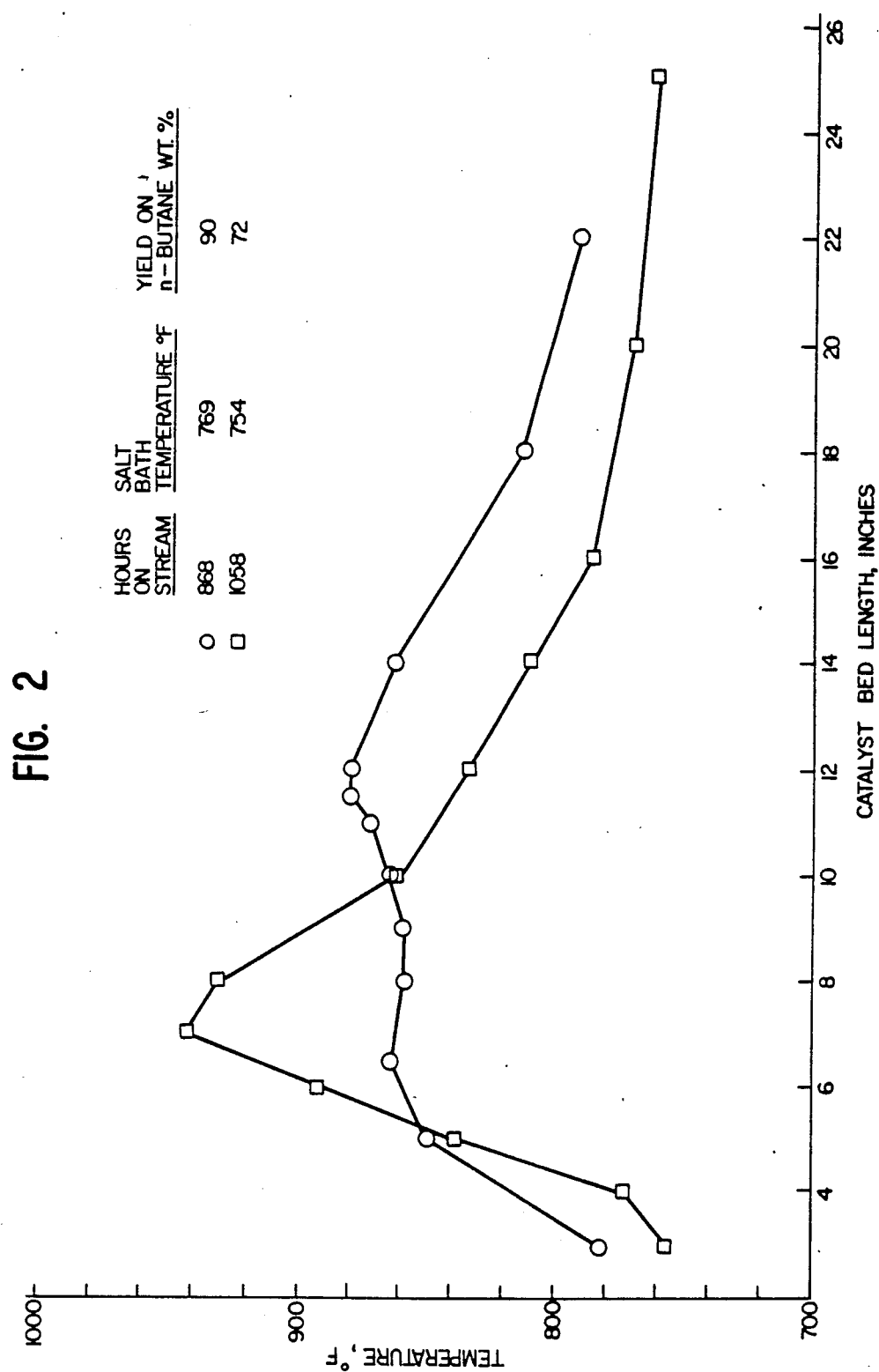

The triethylphosphate was removed from the feed gas saturator at 821 hours. At 868 hours and a salt bath temperature of 769° F., the yield from the reactor was 90 wt.%. This further increase in yield results from the lower and more uniform temperature profile (FIG. 2) produced by discontinuing the triethylphosphate addition at the new "hot spot" location. After 1058 hours, the yield declined to 72 wt.% at a salt bath temperature of 754° F. The temperature profile and location (FIG. 2) returned to nearly the original shape and position demonstrating the reversibility of this process. There is no permanent deactivation of the catalyst in the original "hot spot" location with this process.

EXAMPLE 2

Figure 3:
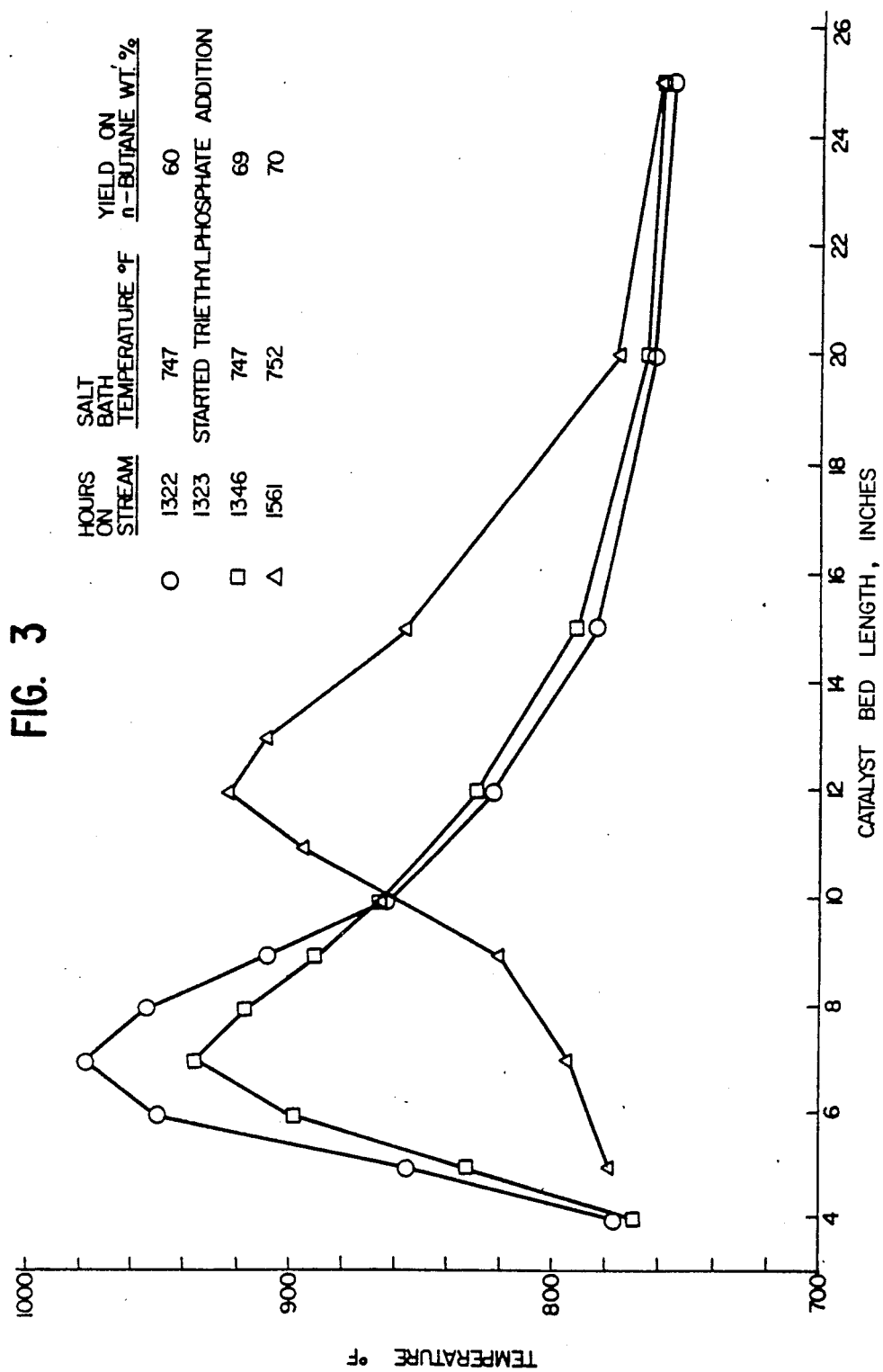

The same catalyst as described in Example 1 was allowed to decline in yield to 60 wt.% at 747° F. salt bath temperature and 1500 VHSV of 1.5 mole % n-butane in air feed. The feed gas was then passed through a saturator containing 1 g of triethylphosphate per liter of water. In this manner, about 10,000 parts per million by weight water are added to the feed gas stream. After 1346 hours the yield improved to 69 wt.% at 747° F. salt bath temperature. This yield increase was merely due to the addition of phosphorus to the catalyst because the "hot spot" position and temperature profile shape remained essentially the same (FIG. 3).

The exotherm moved from 7 inches into the catalyst bed to 12 inches after 1561 hours (FIG. 3); however, the 70 wt.% yield was about the same as before. Once the exotherm reached 15 inches into the bed at 1729 hours (FIG. 4), the yield increased to 82 wt. % at a salt bath temperature of 778° F. This indicates that there is an optimum position for the exotherm and a minor shift in position may not lead to an increase in yield from the catalyst bed.

Figure 4:
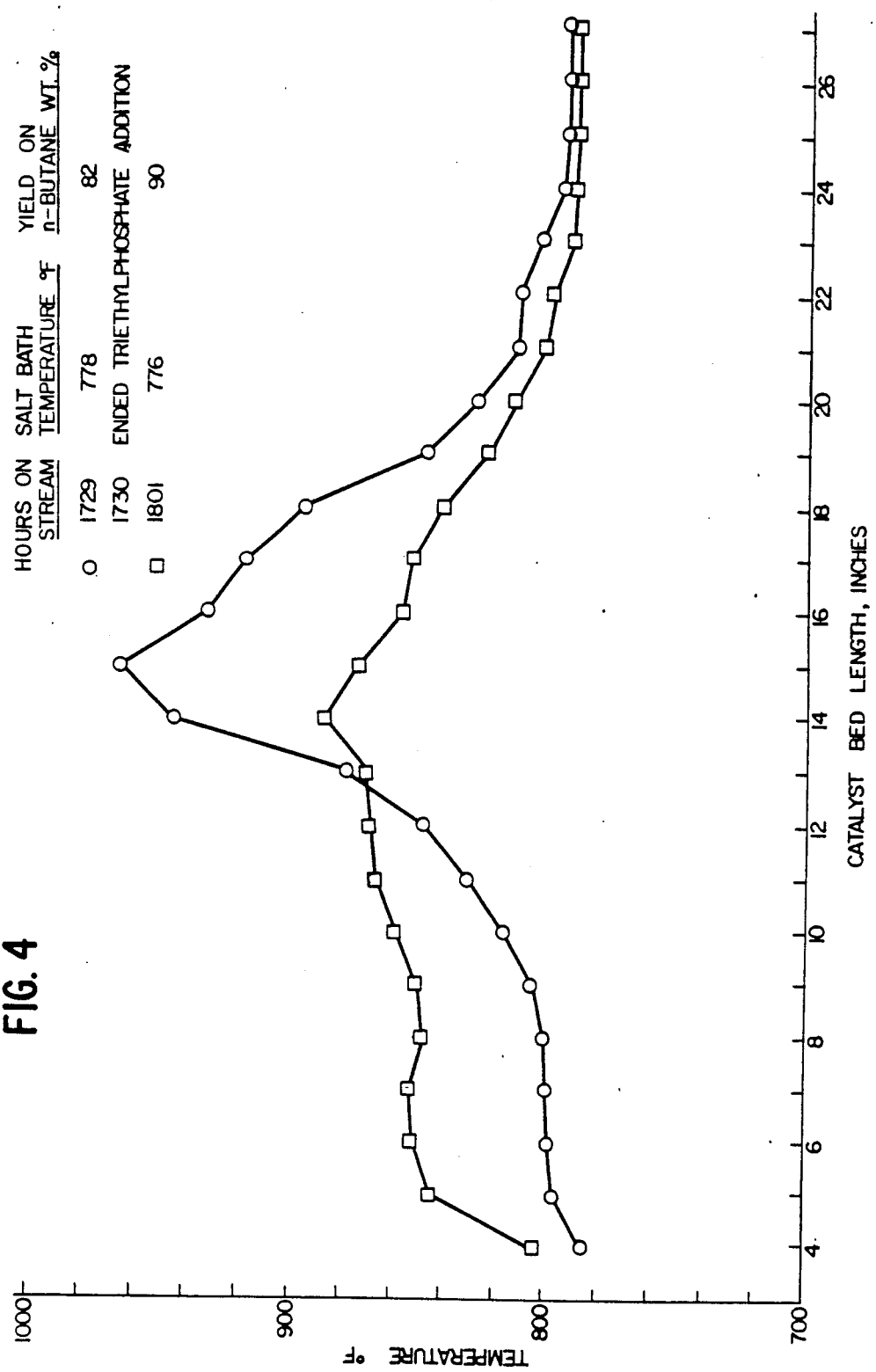

The addition of triethylphosphate was discontinued at 1730 hours. The yield increased further to 90 wt. % at a salt bath temperature of 776° F. after 1801 hours. As shown in FIG. 4, the temperature profile was lower and more uniform in temperature compared to the profile at 1729 hours even though the salt bath temperature was about the same. This example also illustrates that the exotherm may be moved farther into the catalyst bed and then allowed to return to its original position by discontinuing the addition of triethylphosphate and that such a cycle can be repeated on the same catalyst bed.

EXAMPLE 3

The same catalyst as described in Example 2 was allowed to decline in yield to 58 wt.% at 753° F. salt bath temperature and 2000 VHSV of 1.5 mole % of n-butane in air feed after 3145 hours on stream. The feed gas was then passed through a saturator containing 2 g of triethylphosphate per liter of water. The exotherm was located 14 inches into the catalyst bed. After 3313 hours, the exotherm moved to 18 inches and the yield improved to 66 wt.% at a salt bath temperature of 757° F. The exotherm then moved to 20 inches at 3409 hours and the yield was 71 wt.% at 777° F. salt bath temperature.

The addition of triethylphosphate was stopped at 3505 hours. The yield increased further to 90 wt.% at 3577 hours and a salt bath temperature of 793° F. due to the improved temperature profile. This example demonstrates that this process is effective at higher space velocities.

EXAMPLE 4

An extensively used phosphorus-vanadium-molybdenum catalyst was removed from a large reactor in sections according to its location in the reactor. The catalyst, 130 g, was reloaded in sections into a pilot plant reactor having a 0.62-inch i.d. reactor tube and a 33-inch catalyst bed. The reactor is contained in a salt bath to control the teperature and equipped with a ⅛-inch axial thermowell to measure the temperature profile of the reconstructed catalyst bed. The reactor was operated at 2000 VHSV of 1.5 mole % n-butane in air feed.

In the same type of reactor at the same flow and n-butane concentration, another charge of this catalyst gave a maximum yield of 81 wt.% at 745° F. salt bath temperature after it was activated. After 740 hours on stream, the reconstructed catalyst bed gave a yield of 67 wt.% at 713° F. salt bath temperature at the same conditions with the exotherm located at 9 inches into the catalyst bed. At this time the feed gas was passed through a saturator containing 2 g of triethylphosphate per liter of water. In this manner, about 10,000 parts per million by weight water are added to the feed stream. At 1028 hours, the exotherm was at 12 inches and the yield improved to 80 wt.% at 760° F. salt bath temperature. The concentration of triethylphosphate in the saturator was increased to 4 g per liter of $H_2O$ at 1100 hours and to 6 g per liter at 1316 hours.

At 1484 hours, the exotherm location was at 14 inches and the yield was 84 wt.% at a salt bath temperature of 799° F. which is 3 wt.% better than the yield from the fresh catalyst just after activation. As evidenced by this example, exotherm movement can improve an extensively used catalyst to a point where it will perform better than even a freshly activated catalyst.

EXAMPLE 5

An extensively used phosphorus-vanadium-zinc catalyst was removed from a large reactor in sections according to its position in the reactor tube. This catalyst was carefully reloaded into a pilot plant having a 1-inch i.d. reactor tube with a 165-inch catalyst bed. The reactor tube is encased in a salt bath for temperature control and is equipped with an axial thermowell to measure catalyst bed temperature profiles. The reactor was operated at 2000 VHSV of 1.5 mole % n-butane in air feed.

After 1092 hours on stream, the reconstructed catalyst bed gave a 74 wt.% yield at a salt bath temperature of 785° F. At this time, the feed gas was passed through a saturator containing 0.5 g of triethylphosphate per liter of water. In this manner, about 10,000 parts per million by weight water are added to the feed gas stream. The concentration of triethylphosphate was reduced to 0.25 g per liter of water at 1284 hours.

Figure 5:
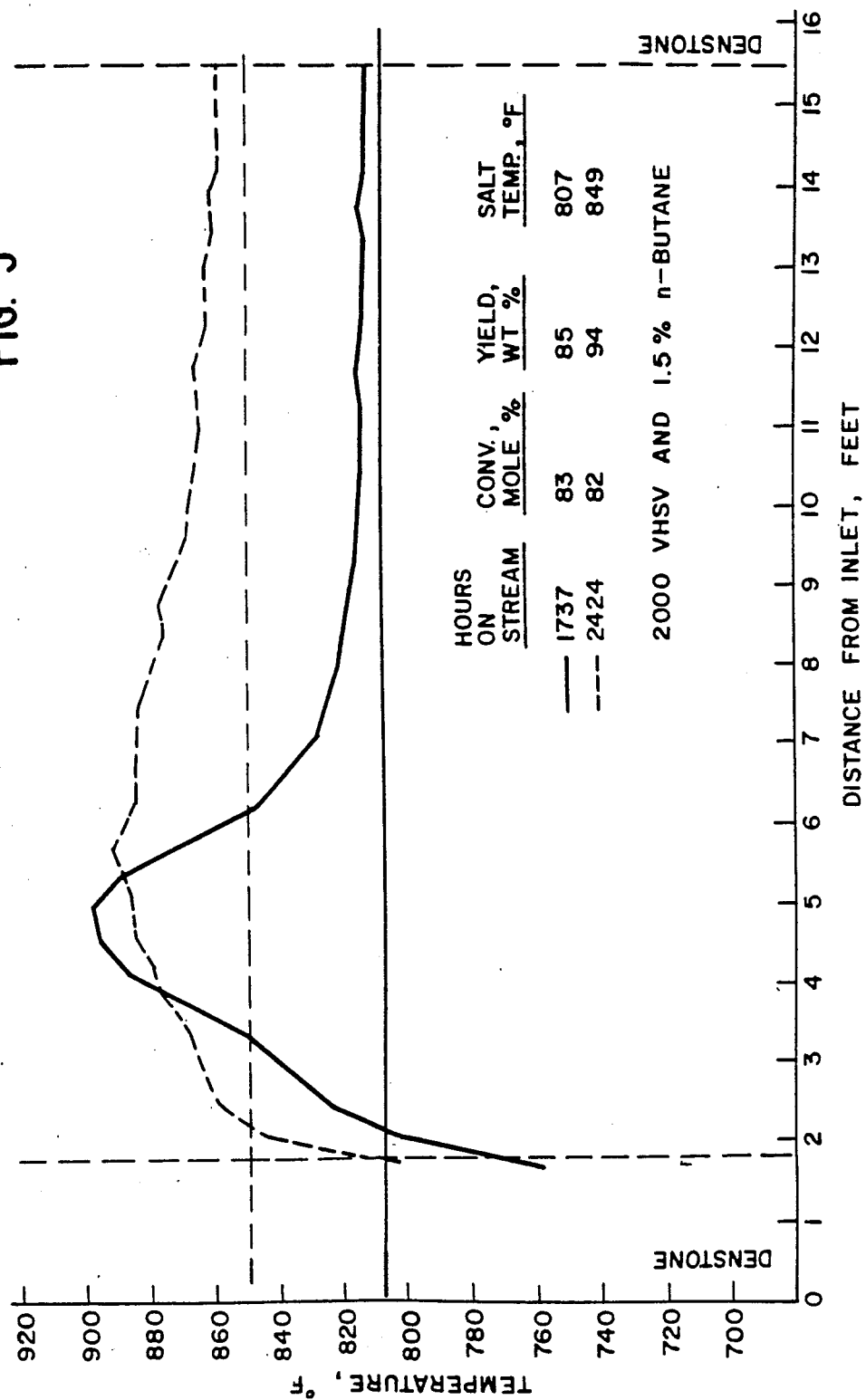

The yield lined out at 85 wt.% yield at 1737 hours and a salt bath temperature of 807° F. with the "hot spot" located at 4.5–5 feet into the reactor as shown in FIG. 5. This increase in yield of 11 wt.% is due to merely replenishing the phosphorus lost by the catalyst during use and not to moving the "hot spot".

The concentration of triethylphosphate in the saturator was gradually increased to 2.5 g per liter of water causing the "hot spot" to move deeper into the bed and the temperature profile of the catalyst bed to become more isothermal. At 2424 hours, the exotherm was located at 5.5–6 feet into the catalyst bed and the temperature profile of the catalyst bed was decidedly more isothermal as shown in FIG. 5. The yield at this time had improved to 94 wt.% at a salt bath temperature of 849° F. This example shows that the catalyst bed can become more isothermal during the continuous addition of water and triethylphosphate. A combination of the shifted exotherm and the more isothermal catalyst bed produced a 9 wt.% improvement in yield.

EXAMPLE 6

A phosphorus-vanadium-molybdenum oxide catalyst, 138 g, was charged to a pilot plant having a 0.62-inch internal diameter reactor and a 33-inch catalyst bed. The reactor is contained in a salt bath to control the temperature and equipped with a ⅛-inch axial thermowell to measure the temperature profile of the catalyst bed. The reactor was operated at 2000 VHSV of 1.5 mole % n-butane in air feed.

The performance of this catalyst is summarized in Table I. The catalyst gave a maximum yield of 77 wt.% at 262 hours on stream with a "hot spot" located at 8 inches into the bed. At 740 hours, the yield had declined to 64 wt.% with a "hot spot" at 10 inches into the bed. The temperature profile at this time is plotted in FIG. 6. Using an Isco metering pump, 10 ppm of triethylphosphate were added to the feed gas stream at 764 hours. At 932 hours, the yield improved to 75 wt.% while the "hot spot" shifted to 16 inches into the bed. At 1028 hours, the yield declined to 73 wt.% with the "hot spot" in the same location. This profile is also shown in FIG. 6.

With triethylphosphate addition held constant at 10 ppm, water was then added to the feed at a concentration of 10,000 ppm. The yield improved to 83 wt.% at 1076 hours as the orginal "hot spot" region began to reactivate and then to 85 wt.% at 1340 hours as the bed became more isothermal as shown in FIG. 6.

TABLE I

| Performance of Catalyst Bed from Example 6 | | | | | | |
|---|---|---|---|---|---|---|
| Hours on Stream | Salt Bath Temp., °F. | "Hot Spot" Location, in. | Triethyl-phosphate in the feed, ppm | Water in the feed, ppm | Conv., % | Yield, Wt. % |
| 262 | 772 | 8 | 0 | 0 | 77 | 77 |
| 740 | 733 | 10 | 0 | 0 | 82 | 64 |
| 764 | — | — | 10 | 0 | — | — |
| 932 | 745 | 16 | 10 | 0 | 78 | 75 |
| 1,028 | 752 | 16 | 10 | 0 | 82 | 73 |
| 1,032 | — | — | 10 | 10,000 | — | — |
| 1,076 | 762 | 18 | 10 | 10,000 | 77 | 83 |
| 1,340 | 761 | 7 | 10 | 10,000 | 81 | 85 |

EXAMPLE 7

The same catalyst bed as described in Example 6 gave the performance presented in Table II at 2000 VHSV of 1.5 mole % n-butane in air feed. With 10,000 ppm of water added to the feed, the catalyst gave a maleic anhydride yield of 74 wt.% with the "hot spot" located at 12 inches into the bed. Upon adding 5 ppm of triethylphosphate to the feed along with 10,000 ppm of water, the "hot spot" moved to 16 inches into the bed and the yield improved to 80 wt.%.

The triethylphosphate addition was discontinued at 2539 hours causing the bed to become more isothermal as the original "hot spot" location started to reactivate.

At 2607 hours on stream, the yield improved further to 85 wt.%.

Examples 6 and 7 point out the importance of water addition along with the addition of phosphorus compounds in manipulating the "hot spot" of the catalyst bed. Using only triethylphosphate (Example 6), a maximum yield of 75 wt.% was achieved from shifting the "hot spot" deeper into the catalyst bed. Combining water addition with triethylphosphate addition in Example 7, a maximum yield of 80 wt.% was obtained by shifting the "hot spot" to the same position.

Once the "hot spot" had been moved in Example 6, the addition of water caused the yield to increase as the catalyst bed become more isothermal. This also occurred in Example 7 as the triethylphosphate addition was discontinued and the water concentration in the feed remained constant. Thus, increasing the water concentration in the feed or discontinuing or decreasing the triethylphosphate in the feed after the "hot spot" has been shifted into the catayst bed will cause the bed to become more isothermal and further increase the maleic anhydride yield.

TABLE II

Performance of Catalyst Bed from Example 7

| Hours on Stream | Salt Bath Temp., °F. | "Hot Spot" Location, in. | Triethyl-phosphate in the feed, ppm | Water in the feed, ppm | Conv., % | Yield, Wt. % |
|---|---|---|---|---|---|---|
| 2,272 | 721 | 12 | 0 | 10,000 | 81 | 74 |
| 2,276 | — | — | 5 | 10,000 | — | — |
| 2,344 | 737 | 16 | 5 | 10,000 | 81 | 80 |
| 2,415 | — | — | 3 | 10,000 | — | — |
| 2,535 | 742 | 18 | 3 | 10,000 | 81 | 78 |
| 2,539 | — | — | 0 | 10,000 | — | — |
| 2,607 | 741 | 17 | 0 | 10,000 | 85 | 85 |

I claim:

1. A process for the improvement of a vanadium-phosphorus-oxygen catalyst having a phosphorus to vanadium atomic ratio of about 2:1 to about 0.8:1 which catalyst is present on a catalyst bed having a portion thereof containing an initial exotherm of reaction, said catalyst being suitable for use in the manufacture of maleic anhydride from a feed gas stream comprising $C_4$ hydrocarbons, benzene, or butane which process comprises: applying to the catalyst bed, simultaneously with introduction of said feed gas stream thereon, water and a phosphorus compound in an amount sufficient to initiate (a) deactivation of said portion of the catalyst containing the initial exotherm, and (b) formation of a new exotherm downstream in the catalyst bed from the initial exotherm, and thereafter reducing or discontinuing application of the phosphorus compound at a point in time when the initial exotherm portion of the catalyst bed is still undergoing deactivation, thereby allowing the partially deactivated exotherm portion to reactivate by producing a more isothermal catalyst bed.

2. The process of claim 1 wherein the feed gas is butane.

3. The process of claim 2 wherein the catalyst bed has a temperature of about 300° to about 500° C.

4. The process of claim 2 wherein the amount of the phosphorus compound added per day is about 0.005 up to about 5 grams per kilogram of the total catalyst in the catalyst bed.

5. The process of claim 1 and claim 4 wherein the amount of water added is about 1000 to about 40,000 parts per million by weight based on the total weight of the feed gas stream.

6. The process of claim 2 wherein the organophosphorus compound is an alkyl ester of orthophosphoric acid.

7. The process of claim 5 wherein the alkyl ester of orthophosphoric acid has the following structure:

$$(RO)_3P=O$$

wherein R is hydrogen or a $C_1$ to $C_4$ alkyl, at least one R being a $C_1$ to $C_4$ alkyl.

8. The process of claim 7 wherein the alkyl ester is triethylphosphate.

9. The process of claim 7 wherein the alkyl ester is trimethylphosphate.

10. The process of claim 1 wherein the organophosphorus compound is selected from the group consisting of:

$$R-\overset{\overset{O}{\|}}{\underset{X}{P}}-X \quad R-\overset{\overset{O}{\|}}{\underset{R}{P}}-R \quad R-\overset{\overset{O}{\|}}{\underset{OX}{P}}-OX \quad R-\overset{\overset{O}{\|}}{\underset{OX}{P}}-R$$

$$R-\underset{OX}{P}-OX \quad RO-\underset{OX}{P}-OX \quad \text{and} \quad RO-\underset{OR}{P}-O-\underset{OR}{P}-OR$$

wherein R is phenyl or an alkyl radical of 1 to 6 carbon atoms and X is H or R.

11. A process for the improvement of a vanadium-phosphorus-oxygen co-metal catalyst having a phosphorus to vanadium atomic ratio of about 2:1 to about 0.8:1 which catalyst is present on a catalyst bed having a portion thereof containing an initial exotherm of reaction, said catalyst being suitable for use in the manufacture of maleic anhydride from a feed gas stream comprising $C_4$ hydrocarbons, benzene, or butane which process comprises: applying to the catalyst bed, simultaneously with introduction of said feed gas stream thereon, water and a phosphorus compound in an amount sufficient to initiate (a) deactivation of said portion of the catalyst containing the initial exotherm, and (b) formation of a new exotherm downstream in the catalyst bed from the initial exotherm, and thereafter reducing or discontinuing application of the phosphorus compound at a point in time when the initial exotherm portion of the catalyst bed is still undergoing deactivation, thereby allowing the partially deactivated exotherm portion to reactivate by producing a more isothermal catalyst bed.

12. The process of claim 11 wherein the catalyst bed has a temperature of about 300° to about 500° C.

13. The process of claim 11 wherein the amount of the phosphorus compound added per day is about 0.005 up to about 5 grams per kilogram of the total catalyst in the catalyst bed.

14. The process of claim 11 wherein the organophosphorus compound is an alkyl ester of orthophosphoric acid.

15. The process of claim 14 wherein the alkyl ester of orthophosphoric acid has the following structure:

$$(RO)_3P=O$$

wherein R is hydrogen or a $C_1$ to $C_4$ alkyl, at least one R being a $C_1$ to $C_4$ alkyl.

16. The process of claim 15 wherein the alkyl ester of orthophosphoric acid is triethylphosphate.

17. The process of claim 15 wherein the alkyl ester of orthophosphoric acid is trimethylphosphate.

18. The process of claim 11 wherein the organophosphorus compound is selected from the group consisting of:

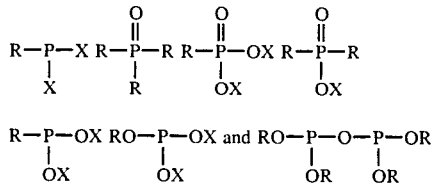

wherein R is phenyl or alkyl radical of 1 to 6 carbon atoms and X is H or R.

19. A process for the improvement of a vanadium-phosphorus-zinc-oxygen catalyst having a phosphorus to vanadium atomic ratio of about 2:1 to about 0.8:1 which catalyst is present on a catalyst bed having a portion thereof containing an initial exotherm of reaction, said catalyst being suitable for use in the manufacture of maleic anhydride from a feed gas stream comprising C4 hydrocarbons, benzene, or butane which process comprises: applying to the catalyst bed, simultaneously with introduction of said feed gas stream thereon, water and a phosphorus compound in an amount sufficient to initiate (a) deactivation of said portion of the catalyst containing the initial exotherm, and (b) formation of a new exotherm downstream in the catalyst bed from the initial exotherm, and thereafter reducing or discontinuing application of the phosphorus compound at a point in time when the initial exotherm portion of the catalyst bed is still undergoing deactivation, thereby allowing the partially deactivated exotherm portion to reactivate by producing a more isothermal catalyst bed.

20. The process of claim 19 wherein the catalyst bed has a temperature of about 300° to about 500° C.

21. The process of claim 19 wherein the amount of the phosphorus compound added per day is about 0.005 up to about 5 grams per kilogram of the total catalyst in the catalyst bed.

22. The process of claim 19 wherein the organophosphorus compound is an alkyl ester of orthophosphoric acid.

23. The process of claim 22 wherein the alkyl ester of orthophosphoric acid has the following structure:

(RO)₃P=O wherein R is hydrogen or a C₁ to C₄ alkyl, at least one R being a C₁ to C₄ alkyl.

24. The process of claim 23 wherein the alkyl ester of orthophosphoric acid is triethylphosphate.

25. The process of claim 23 wherein the alkyl ester of orthophosphoric acid is trimethylphosphate.

26. The process of claim 19 wherein the organophosphorus compound is selected from the group consisting of:

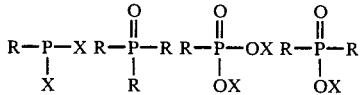
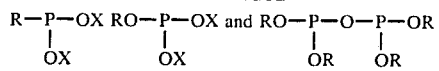

wherein R is phenyl or an alkyl radical of 1 to 6 carbon atoms and X is H or R.

27. A process for the improvement of a vanadium-phosphorus-molybdenum-oxygen catalyst having a phosphorus to vanadium atomic ratio of about 2:1 to about 0.8:1 which catalyst is present on a catalyst bed having a portion thereof containing an initial exotherm of reaction, said catalyst being suitable for use in the manufacture of maleic anhydride from a feed gas stream comprising C4 hydrocarbons, benzene, or butane which process comprises: applying to the catalyst bed, simultaneously with introduction of said feed gas stream thereon, water and a phosphorus compound in an amount sufficient to initiate (a) deactivation of said portion of the catalyst containing the initial exotherm, and (b) formation of a new exotherm downstream in the catalyst bed from the initial exotherm, and thereafter reducing or discontinuing application of the phosphorus compound at a point in time when the initial exotherm portion of the catalyst bed is still undergoing deactivation, thereby allowing the partially deactivated exotherm portion to reactivate by producing a more isothermal catalyst bed.

28. The process of claim 27 wherein the catalyst bed has a temperature of about 300° to about 500° C.

29. The process of claim 26 wherein the amount of the phosphorus compound added per day is about 0.005 up to about 5 grams per kilogram of the total catalyst in the catalyst bed.

30. The process of claim 27 wherein the organophosphorus compound is an alkyl ester of orthophosphoric acid.

31. The process of claim 30 wherein the alkyl ester of orthophosphoric acid has the following structure:

(RO)₃P=O wherein R is hydrogen or a C₁ to C₄ alkyl, at least one R being a C₁ to C₄ alkyl.

32. The process of claim 31 wherein the alkyl ester of orthophosphoric acid is triethylphosphate.

33. The process of claim 31 wherein the alkyl ester of orthophosphoric acid is trimethylphosphate.

34. The process of claim 27 wherein the organophosphorus compound is selected from the group consisting of:

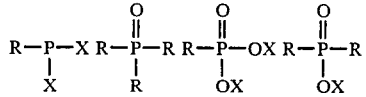
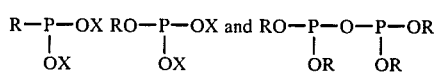

wherein R is phenyl or an alkyl radical of 1 to 6 carbon atoms and X is H or R.

35. A process for the improvement of a vanadium-phosphorus-oxygen catalyst having a phosphorus to vanadium atomic ratio of about 2:1 to about 0.8:1 which catalyst is present on a catalyst bed having a portion thereof containing an initial exotherm of reaction, said catalyst being suitable for use in the manufacture of maleic anhydride from a feed gas stream comprising C₄ hydrocarbons, benzene or butane which process comprises: applying to the catalyst bed, simultaneously with introduction of said feed gas stream thereon, water and a phosphorus compound in an amount sufficient to initiate (a) deactivation of said portion of the catalyst containing the initial exotherm and (b) formation of a new exotherm downstream in the catalyst bed from the initial exotherm, and thereafter, at such time that the initial exotherm portion of the catalyst bed is still undergoing deactivation, reducing the ratio of the amount of phosphorus compound to the amount of water being applied to the bed thereby allowing the partially deactivated exotherm portion to reactivate by producing a more isothermal catalyst bed.

36. The process of claim 35 wherein said reduction of the ratio of the amount of phosphorus compound to the amount of water being applied to the catalyst bed is brought about by increasing the amount of water applied to the catalyst bed.

37. The process of claim 35 wherein the catalyst bed has a temperature of about 300° to about 500° C.

38. The process of claim 35 wherein the amount of the phosphorus compound added per day is about 0.005 up to about 5 grams per kilogram of the total catalyst in the catalyst bed.

39. The process of claim 35 wherein the organophosphorus compound is an alkyl ester of orthophosphoric acid.

40. The process of claim 35 wherein the alkyl ester of orthophosphoric acid has the following structure:

$$(RO)_3P=O$$

wherein R is a hydrogen or a $C_1$ to $C_4$ alkyl, at least one R being a $C_1$ to $C_4$ alkyl.

41. The process of claim 40 wherein the alkyl ester is triethylphosphate.

42. The process of claim 40 wherein the alkyl ester is trimethylphosphate.

43. The process of claim 35 wherein the organo-phosphorus compound is selected from the group consisting of:

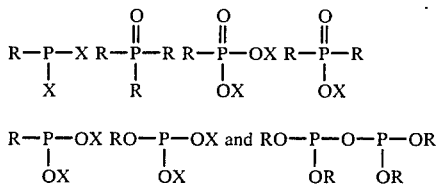

wherein R is phenyl or an alkyl radical of 1 to 6 carbon atoms and X is H or R.

44. A process for the improvement of a vanadium-phosphorus-oxygen-co-metal catalyst having a phosphorus to vanadium atomic ratio of about 2:1 to about 0.8:1 which catalyst is present on a catalyst bed having a portion thereof containing an initial exotherm of reaction, said catalyst being suitable for use in the manufacture of maleic anhydride from a feed gas stream comprising C₄ hydrocarbons, benzene or butane which process comprises: applying to the catalyst bed, simultaneously with introduction of said feed gas stream thereon, water and a phosphorus compound in an amount sufficient to initiate (a) deactivation of said portion of the catalyst containing the initial exotherm and (b) formation of a new exotherm downstream in the catalyst bed from the initial exotherm, and thereafter, at such time that the initial exotherm portion of the catalyst bed is still undergoing deactivation, reducing the ratio of the amount of phosphorus compound to the amount of water being applied to the bed thereby allowing the partially deactivated exotherm portion to reactivate producing a more isothermal catalyst bed.

45. The process of claim 44 wherein the catalyst bed has a temperature of about 300° to about 500° C.

46. The process of claim 44 wherein the amount of the phosphorus compound added per day is about 0.005 up to about 5 grams per kilogram of the total catalyst in the catalyst bed.

47. The process of claim 44 wherein the organophosphorus compound is an alkyl ester of orthophosphoric acid.

48. The process of claim 44 wherein the alkyl ester of orthophosphoric acid has the following structure:

$$(RO)_3P=O$$

wherein R is a hydrogen or a $C_1$ to $C_4$ alkyl, at least one R being a $C_1$ to $C_4$ alkyl.

49. The process of claim 48 wherein the alkyl ester is triethylphosphate.

50. The process of claim 48 wherein the alkyl ester is trimethylphosphate.

51. The process of claim 44 wherein the organophosphorus compound is selected from the group consisting of:

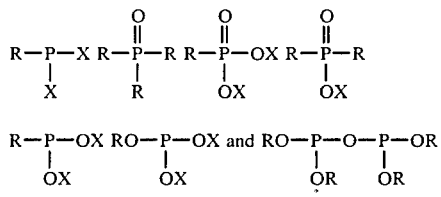

wherein R is phenyl or an alkyl radical of 1 to 6 carbon atoms and X is H or R.

52. The process of claim 44 wherein said reduction of the ratio of the amount of phosphorous to the amount of water being applied to the catalyst bed is brought about by increasing the amount of water being applied to the catalyst bed.

53. A process for the improvement of a vanadium-phosphorus-zinc-oxygen catalyst having a phosphorus to vanadium atomic ratio of about 2:1 to about 0.8:1 which catalyst is present on a catalyst bed having a portion thereof containing an initial exotherm of reaction, said catalyst being suitable for use in the manufacture of maleic anhydride from a fed gas stream comprising C₄ hydrocarbons, benzene or butane which process comprises: applying to the catalyst bed, simultaneously with introduction of said feed gas stream thereon, water and a phosphorus compound in an amount sufficient to initiate (a) deactivation of said portion of the catalyst containing the initial exotherm and (b) formation of a new exotherm downstream in the catalyst bed from the initial exotherm, and thereafter, at such time that the initial exotherm portion of the catalyst bed is still undergoing deactivation, reducing the ratio of the amount of phosphorus compound to the amount of water being applied to the bed thereby allowing the partially deactivated exotherm portion to reactivate by producing a more isothermal catalyst bed.

54. The process of claim 53 wherein the catalyst bed has a temperature of about 300° to about 500° C.

55. The process of claim 53 wherein the amount of the phosphorus compound added per day is about 0.005 up to about 5 grams per kilogram of the total catalyst in the catalyst bed.

56. The process of claim 53 wherein the organophosphorus compound is an alkyl ester of orthophosphoric acid.

57. The process of claim 53 wherein the alkyl ester of orthophosphoric acid has the following structure:

(RO)$_3$P=O wherein R is a hydrogen or a C$_1$ to C$_4$ alkyl, at least one R being a C$_1$ to C$_4$ alkyl.

58. The process of claim 57 wherein the alkyl ester is triethylphosphate.

59. The process of claim 57 wherein the alkyl ester is trimethylphosphate.

60. The process of claim 53 wherein the organophosphorus compound is selected from the group consisting of:

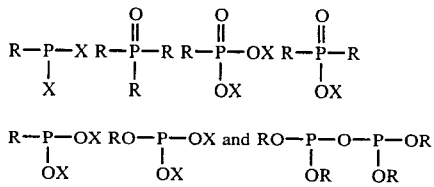

wherein R is phenyl or an alkyl radical of 1 to 6 carbon atoms and X is H or R.

61. The process of claim 53 wherein said reduction of the ratio of the amount of phosphorous to the amount of water being applied to the catalyst bed is brought about by increasing the amount of water being applied to the catalyst bed.

62. The process of claim 53 wherein the catalyst bed has a temperature of about 300° to about 500° C.

63. The process of claim 53 wherein the amount of the phosphorus compound added per day is about 0.005 up to about 5 grams per kilogram of the total catalyst in the catalyst bed.

64. The process of claim 53 wherein the organophosphorus compound is an alkyl ester of orthophosphoric acid.

65. The process of claim 53 wherein the alkyl ester of orthophosphoric acid has the following structure:

(RO)$_3$P=O wherein R is a hydrogen or a C$_1$ to C$_4$ alkyl, at least one R being a C$_1$ to C$_4$ alkyl.

66. The process of claim 65 wherein the alkyl ester is triethylphosphate.

67. The process of claim 65 wherein the alkyl ester is trimethylphosphate.

68. The process of claim 53 wherein the organo-phosphorus compound is selected from the group consisting of:

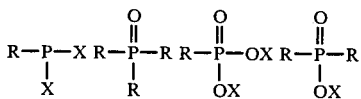

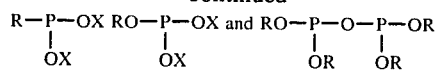

wherein R is phenyl or an alkyl radical of 1 to 6 carbon atoms and X is H or R.

69. A process for the improvement of a vanadium-phosphorous-molybdenum-oxygen catalyst having a phosphorus to vanadium atomic ratio of about 2:1 to about 0.8:1 which catalyst is present on a catalyst bed having a portion thereof containing an initial exotherm of reaction, said catalyst being suitable for use in the manufacture of maleic anhydride from a feed gas stream comprising C$_4$ hydrocarbons, benzene or butane which process comprises: applying to the catalyst bed, simultaneously with introduction of said feed gas stream thereon, water and a phosphorus compound in an amount sufficient to initiate (a) deactivation of said portion of the catalyst containing the initial exotherm and (b) formation of a new exotherm downstream in the catalyst bed from the initial exotherm, and thereafter, at such time that the initial exotherm portion of the catalyst bed is still undergoing deactivation, reducing the ratio of the amount of phosphorus compound to the amount of water being applied to the bed thereby allowing the partially deactivated exotherm portion to reactivate by producing a more isothermal catalyst bed.

70. The process of claim 69 wherein the catalyst bed has a temperature of about 300° to about 500° C.

71. The process of claim 69 wherein the amount of the phosphorus compound added per day is about 0.005 up to about 5 grams per kilogram of the total catalyst in the catalyst bed.

72. The process of claim 69 wherein the organophosphorus compound is an alkyl ester of orthophosphoric acid.

73. The process of claim 69 wherein the alkyl ester of orthophosphoric acid has the following structure:

(RO)$_3$P=O wherein R is a hydrogen or a C$_1$ to C$_4$ alkyl, at least one R being a C$_1$ to C$_4$ alkyl.

74. The process of claim 73 wherein the alkyl ester is triethylphosphate.

75. The process of claim 73 wherein the alkyl ester is trimethylphosphate.

76. The process of claim 59 wherein the organophosphorus compound is selected from the group consisting of:

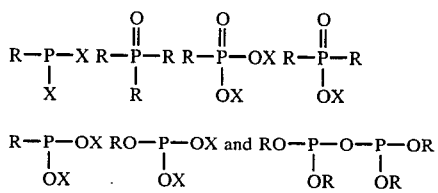

wherein R is phenyl or an alkyl radical of 1 to 6 carbon atoms and X is H or R.

77. The process of claim 64 wherein said reduction of the ratio of the amount of phosphorous to the amount of water being applied to the catalyst bed is brought about by increasing the amount of water being applied to the catalyst bed.

78. A process for the improvement of a vanadium-phosphorus-oxygen catalyst having a phosphorus to vanadium atomic ratio of about 2:1 to about 0.8:1, which catalyst is present in a catalyst bed having a portion thereof containing an initial exotherm of reaction, said catalyst being suitable for use in the manufacture of maleic anhydride from a feed gas stream comprising C$_4$ hydrocarbons, benzene, or butane, which process comprises: applying to the catalyst bed, simultaneously with introduction of said feed gas stream thereon, water and a phosphorus compound in an amount sufficient to initiate (a) deactivation of said portion of the catalyst bed containing the initial exotherm and (b) formation of a new exotherm downstream in the catalyst bed from the initial exotherm, and thereafter, at such time that the initial exotherm portion of the catalyst bed is still undergoing deactivation, discontinuing application of the phosphorus compound while allowing the water application to continue, thereby allowing the partially deactivated exotherm to reactivate by producing a more isothermal catalyst bed.

79. A process for the improvement of a vanadium-phosphorus-oxygen-co-metal catalyst having a phosphorus to vanadium atomic ratio of about 2:1 to about 0.8:1, which catalyst is present in a catalyst bed having a portion thereof containing an initial exotherm of reaction, said catalyst being suitable for use in the manufacture of maleic anhydride from a feed gas stream comprising C$_4$ hydrocarbons, benzene, or butane, which process comprises: applying to the catalyst bed, simultaneously with introduction of said feed gas stream thereon, water and a phosphorus compound in an amount sufficient to initiate (a) deactivation of said portion of the catalyst bed containing the initial exotherm and (b) formation of a new exotherm downstream in the catalyst bed from the initial exotherm, and thereafter, at such time that the initial exotherm portion of the catalyst bed is still undergoing deactivation, discontinuing application of the phosphorus compound while allowing the water application to continue, thereby allowing the partially deactivated exotherm to reactivate by producing a more isothermal catalyst bed.

80. The process of claim 79 wherein the catalyst bed has a temperature of about 300° to about 500° C.

81. The process of claim 79 wherein the amount of the phosphorus compound added per day is about 0.005 up to about 5 grams per kilogram of the total catalyst in the catalyst bed.

82. The process of claim 79 wherein the organophosphorus compound is an alkyl ester of orthophosphoric acid.

83. The process of claim 79 wherein th alkyl ester of orthophosphoric acid has the following structure:

wherein R is a hydrogen or a C$_1$ to C$_4$ alkyl, at least one R being a C$_1$ to C$_4$ alkyl.

84. The process of claim 83 wherein the alkyl ester is triethylphosphate.

85. The process of claim 83 wherein the alkyl ester is trimethylphosphate.

86. The process of claim 79 wherein the organo-phosphorus compound is selected from the group consisting of:

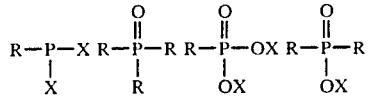

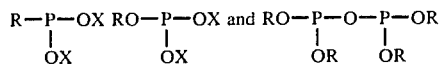

wherein R is phenyl or an alkyl radical of 1 to 6 carbon atoms and X is H or R.

87. A process for the improvement of a vanadium-phosphorus-zinc-oxygen catalyst having a phosphorus to vanadium atomic ratio of about 2:1 to about 0.8:1, which catalyst is present in a catalyst bed having a portion thereof containing an initial exotherm of reaction, said catalyst being suitable for use in the manufacture of maleic anhydride from a feed gas stream comprising C$_4$ hydrocarbons, benzene, or butane, which process comprises: applying to the catalyst bed, simultaneously with introduction of said feed gas stream thereon, water and a phosphorus compound in an amount sufficient to initiate (a) deactivation of said portion of the catalyst bed containing the initial exotherm and (b) formation of a new exotherm downstream in the catalyst bed from the initial exotherm, and thereafter, at such time that the initial exotherm portion of the catalyst bed is still undergoing deactivation, discontinuing application of the phosphorus compound while allowing the water application to continue, thereby allowing the partially deactivated exotherm to reactivate by producing a more isothermal catalyst bed.

88. The process of claim 87 wherein the catalyst bed has a temperature of about 300° to about 500° C.

89. The process of claim 87 wherein the amount of the phosphorus compound added per day is about 0.005 up to about 5 grams per kilogram of the total catalyst in the catalyst bed.

90. The process of claim 87 wherein the organophosphorus compound is an alkyl ester of orthophosphoric acid.

91. The process of claim 87 wherein the alkyl ester of orthophosphoric acid has the following structure:

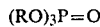

wherein R is a hydrogen or a C$_1$ to C$_4$ alkyl, at least one R being a C$_1$ to C$_4$ alkyl.

92. The process of claim 91 wherein the alkyl ester is triethylphosphate.

93. The process of claim 91 wherein the alkyl ester is trimethylphosphate.

94. The process of claim 87 wherein the organo-phosphorus compound is selected from the group consisting of:

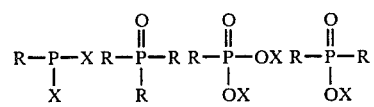

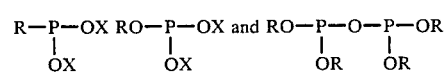

wherein R is phenyl or an alkyl radical of 1 to 6 carbon atoms and X is H or R.

95. A process for the improvement of a vanadium-phosphorus-molybdenum-oxygen catalyst having a phosphorus to vanadium atomic ratio of about 2:1 to about 0.8:1, which catalyst is present in a catalyst bed having a portion thereof containing an initial exotherm of reaction, said catalyst being suitable for use in the manufacture of maleic anhydride from a feed gas stream comprising $C_4$ hydrocarbons, benzene, or butane, which process comprises: applying to the catalyst bed, simultaneously with introduction of said feed gas stream thereon, water and a phosphorus compound in an amount sufficient to initiate (a) deactivation of said portion of the catalyst bed containing the initial exotherm and (b) formation of a new exotherm downstream in the catalyst bed from the initial exotherm, and thereafter, at such time that the initial exotherm portion of the catalyst bed is still undergoing deactivation, discontinuing application of the phosphorus compound while allowing the water application to continue, thereby allowing the partially deactivated exotherm to reactivate by producing a more isothermal catalyst bed.

96. The process of claim 95 wherein the catalyst bed has a temperature of about 300° to about 500° C.

97. The process of claim 95 wherein the amount of the phosphorus compound added per day is about 0.005 up to about 5 grams per kilogram of the total catalyst in the catalyst bed.

98. The process of claim 95 wherein the organophosphorus compound is an alkyl ester of orthophosphoric acid.

99. The process of claim 95 wherein the alkyl ester of orthophosphoric acid has the following structure:

$$(RO)_3P=O$$

wherein R is a hydrogen or a $C_1$ to $C_4$ alkyl, at least one R being a $C_1$ to $C_4$ alkyl.

100. The process of claim 99 wherein the alkyl ester is triethylphosphate.

101. The process of claim 99 wherein the alkyl ester is trimethylphosphate.

102. The process of claim 95 wherein the organophosphorus compound is selected from the group consisting of:

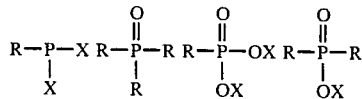

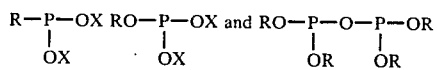

wherein R is phenyl or an alkyl radical of 1 to 6 carbon atoms and X is H or R.

* * * * *

UNITED STATES PATENT OFFICE
CERTIFICATE OF CORRECTION

Patent No. 4,701,433          Dated October 20, 1987

Inventor(s)  Robert C. Edwards

It is certified that error appears in the above-identified patent and that said Letters Patent are hereby corrected as shown below:

Patent reads:

| Col. | Line | | |
|---|---|---|---|
| 1 | 39 | "art improve" and should read | --art to improve-- |
| 2 | 44 | "which ahs" and should read | --which has-- |
| 3 | 41 | "alkyl eesters" and should read | --alkyl esters-- |
| 7 | 52 | "no-butane" and should read | --n-butane-- |
| 9 | 11 | "teperature" and should read | --temperature-- |
| 11 | 58 | "reactivate by producing" and should read | --reactivate producing-- |
| 12 | 51 | "reactivate by producing" and should read | --reactivate producing-- |
| 13 | 38 | "reactivate by producing" and should read | --reactivate producing-- |
| 14 | 27 | "reactivate by producing" and should read | --reactivate producing-- |
| 15 | 14 | "reactivate by producing" and should read | --reactivate producing-- |
| 16 | 54 | "fed" and should read | --feed-- |
| 16 | 67 | "by producing" and should read | --producing-- |
| 17 | 60-1 | "organo-phosphorus" and should read | --organophosphorus-- |

UNITED STATES PATENT OFFICE
CERTIFICATE OF CORRECTION

Patent No. 4,701,433      Dated October 20, 1987

Inventor(s) Robert C. Edwards

It is certified that error appears in the above-identified patent and that said Letters Patent are hereby corrected as shown below:

Patent reads:

| Col. | Line | | |
|---|---|---|---|
| 18 | 28 | "by producing" | and should read --producing-- |
| 19 | 22 | "by producing" | and should read --producing-- |
| 19 | 44 | "by producing" | and should read --producing-- |
| 19 | 66 | "organo-phosphorus" | and should read --organophosphorus-- |
| 20 | 33 | "by producing" | and should read --producing-- |
| 20 | 55 | "organo-phosphorus" | and should read --organophosphorus-- |
| 21 | 22 | "by producing" | and should read --producing-- |

Signed and Sealed this

Twenty-fifth Day of October, 1988

*Attest:*

DONALD J. QUIGG

*Attesting Officer*      *Commissioner of Patents and Trademarks*